United States Patent [19]

Nakajima et al.

[11] 4,106,430

[45] Aug. 15, 1978

[54] SINGLE CHAMBER TYPE COATING AND BAKING APPARATUS

[75] Inventors: Takashi Nakajima, Nishinomiya; Tomoyuki Irie, Neyagawa; Keiichi Kusumoto, Sakai, all of Japan

[73] Assignee: Nippon Paint Co., Ltd., Osaka, Japan

[21] Appl. No.: 779,224

[22] Filed: Mar. 18, 1977

[30] Foreign Application Priority Data

Mar. 26, 1976 [JP] Japan .................. 51-033788

[51] Int. Cl.² .......................................... B05C 15/00
[52] U.S. Cl. ..................... 118/64; 34/225; 118/DIG. 7
[58] Field of Search ............... 118/64, 65, DIG. 7, 118/634, 326; 34/225, 212; 98/115 SB

[56] References Cited

U.S. PATENT DOCUMENTS

| 2,637,120 | 5/1953 | Lesniak et al. ............ 34/225 X |
| 3,673,703 | 7/1972 | Wieligmann ................. 34/225 |
| 3,977,091 | 8/1976 | Hortig et al. ............... 34/225 X |

FOREIGN PATENT DOCUMENTS 606,132  10/1960  Canada ........................... 34/225

Primary Examiner—John P. McIntosh
Attorney, Agent, or Firm—Wenderoth, Lind & Ponack

[57] ABSTRACT

A single chamber type coating and baking apparatus which includes a chamber having one opening through the ceiling and two openings through the floor. A means for discharging the air within the chamber to the outside is connected to one of the openings through the floor. There are means for generating and directing hot wind toward the opening in the ceiling, and a means for recycling the air in the chamber to the hot wind generating means which is connected to the inlet side of the means for generating hot wind at one end and at the other end to one of the openings in the floor part of said chamber. Also, a means is provided for introducing fresh air into the system and is connected to the recycling means.

5 Claims, 2 Drawing Figures

SINGLE CHAMBER TYPE COATING AND BAKING APPARATUS

The present invention relates to a single chamber type coating and baking apparatus and, more particularly to a single chamber type apparatus by which an article to be coated can be advantageously and favorably coated and baked in a small area of installation.

BACKGROUND OF THE INVENTION

Generally, in industrial production facilities for automobiles, for example, there is adopted a flow production system, in which the coating process is practiced with the operations of spraying, setting, and baking which are suitable for the coating composition to be used, so that the performance of the formed coating film is quite excellent. However, when automobiles are repaired, the situation is different from the above production, and it is usual that the repair coating is varied with each case. Moreover, coating compositions to be utilized for repair purposes are in recent days being transformed from the type to be dried at atmospheric temperature to the type to be dried by baking. Accordingly, in the repair coating, the coating apparatus (a so-called coating booth) and the baking apparatus have to be provided separately, which requires a large area for installation of the apparatus and provides a disadvantage for installation.

SUMMARY OF THE INVENTION

According to the present invention, an apparatus is provided which overcomes the above defects by, providing a chamber which has openings in the ceiling part and the floor part, a means for discharging the air from the chamber to the outside which is being connected to one of the openings on the floor part of said chamber, a means for generating hot wind, a means for returning the air inside the chamber to the hot wind generating means which is connected to the inlet side of the means for generating hot wind and the other end of which is connected to the other opening on the floor part of said chamber, and a means for sending air into the chamber which being connected to the outlet the of said hot wind generating means, the other end being connected to the opening in the ceiling part of said chamber.

BRIEF DESCRIPTION OF THE DRAWINGS

The present invention will be understood in further detail from the following description made in reference to the appended drawings wherein.

DETAILED DESCRIPTION OF THE INVENTION

Figure 1:
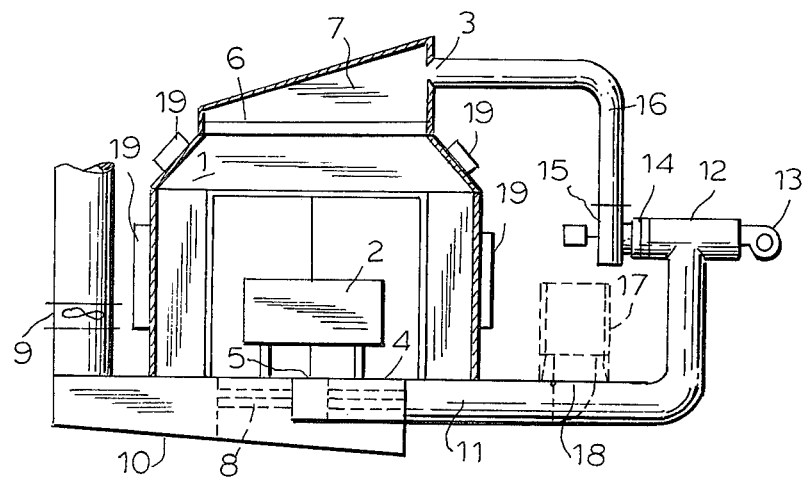
FIG. 1 is a simplified sectional view to show an example of the apparatus of the present invention.
Figure 2:
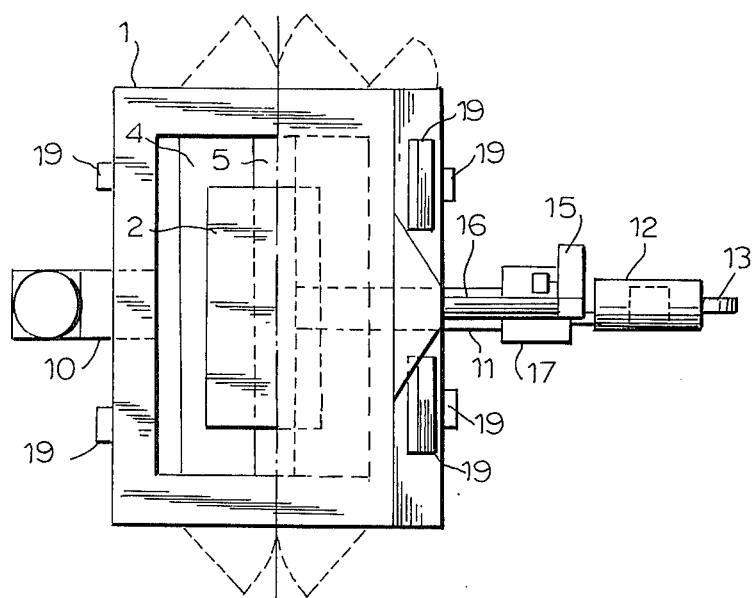
FIG. 2 is a plan view of said apparatus with its part cut out.

In the drawings, a chamber 1 in which coating and baking are carried out has an internal space sufficient to contain an article to be coated 2 and to carry out the coating thereof. The chamber has openings 3, 4 and 5; one opening 3 in the ceiling part and two openings 4, 5 in the floor part. On the ceiling part in the chamber below the opening 3, is a filter 6 which forms the base of an air supply chamber 7. The opening 5, provided immediately below the article 2, has an opening area smaller than the opening 4. The opening 4, outside the opening 5, has an opening area smaller than the floor area so as not to distrub the coating work. Over the entire opening 4, is a filter 8 on the same level as or slightly lower than the upper end (i.e. the floor surface level) of the opening 5 (preferably on the level lower by more than 10 cm than the floor surface level). A duct 10, having a fan 9, is provided which leads to the inside of the chamber through this filter 8. A duct 11, which leads to the opening 5, is connected at its other end with the inlet side of a hot wind generating means 12. This generator means 12 has a burner 13 and is either a direct or indirect heating system, and is also provided with a flame arrester 14 and a fan 15. A duct 16 is connected with the outlet side (i.e. the fan 15) of this generator means 12. The other end of this duct 16 is connected with the ceiling opening 3. The duct 11 includes, at the intermediate position of its route, a means 17 for taking in the fresh air through a filter which leads to the fresh air duct 11. A damper 18 is provided on the means 17 where it connections to the duct 11. Illumination means 19 are directed inside the chamber 1. The fans 9 and 15 are selected and operated so as to furnish the inside of the chamber 1 with a positive pressure to thereby prevent dust from coming into the chamber through the gaps between the connected structural members or through the door-way of the chamber.

In the apparatus comprising the above constitution, the damper 18 is actuated to shut off the route of the fresh air duct 11, while on the other hand the means 17 is led to the generator inlet side of the means 12. Then, without ingiting the burner 13, the fans 9 and 15 are actuated. By these steps preparations for coating are completed. During the coating work, the fresh air is purified and introduced from the fresh air means 17 by the fan 15, sucked in through the duct 11 and the generator means 12, and then finally sent into the air supply chamber 7 through the duct 16. From the air supply chamber 7, the air is further purified through the filter 6 and passed into the chamber 1. The air in the chamber 1 containing the coating composition mist produced by the coating work is removed in through the opening 4 by the fan 9, freed from the resin component, etc. by the filter 8, and discharged outside the chamber through the duct 10. Since the discharged air contains a solvent component, the air may be subjected to aftertreatment, as necessary. As described above, because of the construction wherein the opening area of the opening 4 is made smaller than the floor area, the air which flows through the chamber during the coating operation surrounds the article 2 and forms a tapering shape like an inverted cone; the outer circumference thereof becomes an air curtain. This construction provides for smaller splashes of the coating composition mist on to the worker and is desirable from the point of sanitation.

Alternatively, the operation may be conducted in such a manner that, without actuating the damper 18 as above, both the duct 11 and the fresh air means 17 communicate with the inlet side of the means 12. In that case the fan 15 per se must have a larger capacity than fan 9. Otherwise, the system may be operated with the leading of the duct 11 to the means 17 shut off. In the latter case, there is a possibility that the chamber 1 will be charged with a negative pressure, and the chances for adhesion of dust to the article 2 are increased. Moreover, in each of these cases, there are increased probabilities for the coating composition mist and the evaporated solvents to circulate in the chamber. Therefore, the method previously explained on the basis of the illustration is most preferred.

Furthermore, during the baking process, the damper 18 is actuated as illustrated to block the duct 11 and shut off the fresh air means 17 from the duct 11. Also, with the fan 9 stopped, the burner 13 is actuated. The heated air generated in the generator means 12 then flows through the duct 16 because of the fan 15 and is sent into the air supply chamber 7. The heated air is purified as it flows through the filter 6 and into the chamber 1, after which it is sucked into the duct 11 through the opening 5 and passes back into the generator means 12 again. Because the opening area of the opening 5 is narrower than that of the opening 4, the heated air flowing inside the chamber constitutes a tapered state more tapered than that produced during the coating work, and comes into contact with the article 2 in a concentrated state. Consequently, the effect of the baking, especially the thermal efficiency is favorably enhanced. Further, because the filter 8 which on at least the opening 4 is situated on the same level as, and preferably lower than the opening 5, the filter 8 does not sustain the thermal effect created by the heated air which flows in a tapered state as described above, and accordingly, there is little possibility that the resin component caught thereby will burn.

According to the present invention as above, both coating and baking are satisfactorily carried out within the reduced installation area of the apparatus in a single chamber type system. Furthermore, the environment in the chamber during the coating work is improved the thermal efficiency in baking is improved, and also the danger within fire of the apparatus is eliminated.

What is claimed is:

1. A apparatus for coating and baking an item positioned thereinside, said apparatus comprising:
    enclosed chamber means having a ceiling and floor for containing said item a first opening in said ceiling and second and third openings in said floor, said third opening being smaller than and positioned within said second opening, which is smaller than said floor, both of said second and third openings being positioned directly beneath said item in said chamber means;
    exhaust means connected to said second opening for exhausting air in said chamber to the outside of said chamber;
    heat generating means connected to said first opening for supplying heated air into said chamber; and
    recycling means connected to said third opening and to said heat generating means for returning the air in said chamber to said heat generating means.

2. An apparatus as claimed in claim 1 further comprising: a first filter means across the top of said chamber means beneath said first opening for filtering the air entering said chamber means through said first opening.

3. An apparatus as claimed in claim 1 further comprising: a second filter means in said second opening and positioned no higher than said third opening for filtering the air leaving said chamber through said exhaust means connected to said second opening.

4. An apparatus as claimed in claim 1, further comprising:
    fresh air introduction means connected to said recycling means between said third opening and said heat generating means for supplying fresh air thereinto; and
    damper means between said fresh air means and said recycling means for alternatively closing said recycling means between said fresh air introduction means and said third opening, whereby fresh air enters said heat generating means and recycling of the air in said chamber to said heat generating means is prohibited, and alternatively closing said fresh air introduction means into said recycling means, whereby fresh air does not enter into said recycling means and the air in said chamber exiting through said third opening proceeds through said recycling means to said heat generating means.

5. An apparatus as claimed in claim 1, wherein said heat generating means is an indirect heating system.

* * * * *